United States Patent [19]

Ehring

[11] Patent Number: 4,548,484

[45] Date of Patent: Oct. 22, 1985

[54] ATTACHMENT FOR SPECTACLE TEMPLES

[76] Inventor: Markus Ehring, Postfach 1132, 4788 Warstein, Fed. Rep. of Germany

[21] Appl. No.: 486,951

[22] PCT Filed: Aug. 5, 1982

[86] PCT No.: PCT/DE82/00159

§ 371 Date: Apr. 11, 1983

§ 102(e) Date: Apr. 11, 1983

[87] PCT Pub. No.: WO83/00565

PCT Pub. Date: Feb. 17, 1983

[30] Foreign Application Priority Data

Aug. 12, 1981 [DE] Fed. Rep. of Germany ....... 3131801

[51] Int. Cl.⁴ .............................................. G02C 5/14
[52] U.S. Cl. ................................... 351/123; 351/119
[58] Field of Search ............. 351/111, 116, 118, 119, 351/122, 123

[56] References Cited

U.S. PATENT DOCUMENTS

| | | |
|---|---|---|
| 1,833,792 | 11/1931 | Pfaus . |
| 2,172,959 | 9/1939 | Hirtenstein . |
| 2,229,568 | 1/1941 | Hodgkins ............................ 351/123 |
| 3,649,106 | 3/1972 | Hirschmann, Jr. ................. 351/119 |
| 4,012,130 | 3/1977 | Guillet ................................ 351/123 |

FOREIGN PATENT DOCUMENTS 2280097  2/1976  France .
2360902  3/1978  France .

*Primary Examiner*—Rodney B. Bovernick
*Assistant Examiner*—Paul M. Dzierzynski
*Attorney, Agent, or Firm*—McGlew and Tuttle

[57] ABSTRACT

An attachment (1) for a spectacle temple which, in order to transform regular eyeglasses into sporting glasses, is detachably secured to the temple and comprises a leg (2) and an adjacent substantially semicircular end portion (3).

11 Claims, 6 Drawing Figures

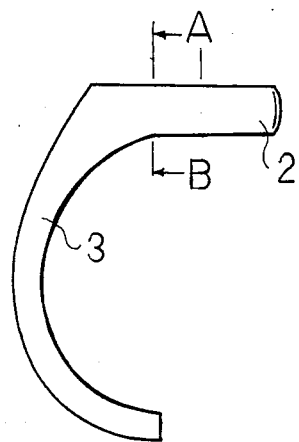
FIG. 1
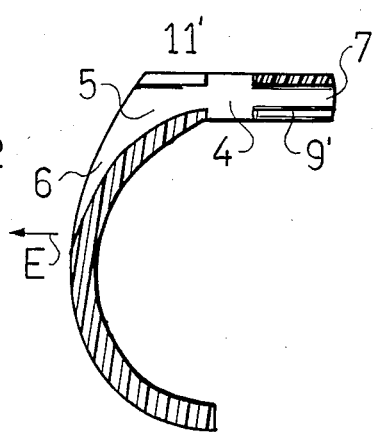
FIG. 3
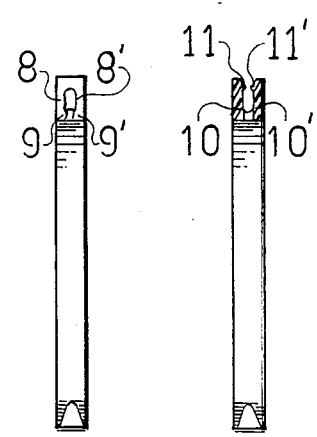
FIG. 4
FIG. 5
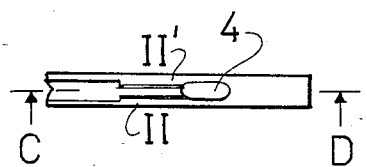
FIG. 2
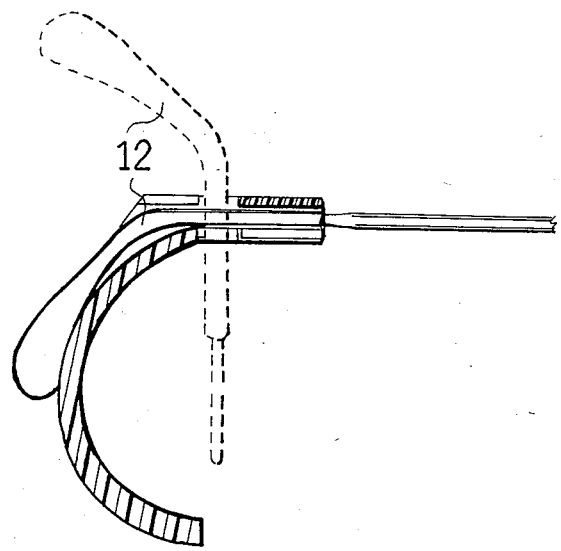
FIG. 6

ATTACHMENT FOR SPECTACLE TEMPLES

FIELD AND BACKGROUND OF THE INVENTION

In normal eyeglasses, the spectacle temple is designed to ensure a satisfactory seat of the frame, and also to prevent the glasses from becoming a hindrance to the user in any substantial manner. This last requirement cannot be met with a spectacle frame which, even though remaining in wanted position during usual body activities, does not remain in place during abrupt movements, such as during sporting activities. The glasses shift or even get loose and drop to the ground. Vision-handicapped persons are exposed to this inconvenience especially while engaging in a sport.

To avoid these drawbacks, it is known to equip the spectacle frame with special temple embracing the outer ear more than in normal spectacles, and thus making possible a firm seat of the spectacles even during abrupt movements.

What is disadvantageous in these so-called sporting glasses is that in normal use, they are not comfortable. Further known are sporting glasses having a rubber band secured to the frame and forming a loop around the user's head. While the frame is held in position by the pull of the rubber, the bridge of the frame is pressed against the root of the nose. Frequently, this causes headaches or similar problems. Therefore, as a rule, sporting glasses of this shape are kept as second eyeglasses in addition to glasses for regular use, which is an additional expense.

SUMMARY OF THE INVENTION

The invention is directed to making usual spectacles adaptable so that they may be used for purposes of every day life and also for sporting and similar activities, as desired. More particularly, the objective is to be able to modify a conventional spectacle frame to ensure a firm seat thereof even during engagement in sports, without resorting to permanent changes in the frame for ordinary use.

To this end and in accordance with the invention, an attachment is provided which is so designed that it is detachably securable to a spectacle frame and in such a contact with the ear or head of the spectacle user that the spectacles are fixed even during abrupt movements, such as during a sporting activity. In a preferred embodiment, the attachment comprises a leg and a substantially semicircular end portion adjacent thereto, with the leg being equipped with a clamping or snap-action mechanism for connecting to the spectacle temple in a non-positive manner.

While employing the inventive attachment, it suffices to have but one spectacles for both normal use and sporting activities. In a simple way, the normal spectacles will be transformed into sporting spectacles, as needed, by equipping the frame with the inventive attachment.

BRIEF DESCRIPTION OF THE INVENTION

In the following, the essence of the invention is explained in more detail with reference to the drawing in which;

FIG. 1 is a side view of an inventive attachement:
FIG. 2 is a top plan view of the attachment;
FIG. 3 is a sectional view taken along the line CD of FIG. 2;
FIG. 4 is a right-hand side view of the attachment of FIG. 1 taken in the E direction;
FIG. 5 is a sectional view taken along the line AB of FIG. 1; and
FIG. 6 explains the manner of fixing the attachment in position on a temple.

DESCRIPTION OFF THE PREFERRED EMBODIMENT

The attachment of the invention, comprises a leg or leg portion 2 and an adjoining, substantially semicircular part 3, the end portion of the attachment. A slot opening or oblong hole 4 of horizontal extension is provided in leg 2, extending vertically through the leg. Hole 4 is of such shape that the end 12 of a spectacle temple shown in FIG. 6, of a normal spectacle frame, can be passed through from below (FIGS. 1, 2). The oblong hole 4 is followed, at the end portion 3 side, by an upwardly open U-section portion or zone 5, and toward the free end of leg 2, by a downwardly open U-section portion or zone 7. This design of the leg prevents the attachment 1, when put in place, from being exposed to shearing forces relative to the temple. Portion 5 of leg 2 extends further into end portion 3 as a groove 6 narrowing downwardly and shallowing out. On each inside of the walls 8, 8' and 10,10' of portions 5 and 7, two small protuberances 9, 9' and 11,11' are provided. The attachment is made in one piece of a thermoplastic plastic. Walls 8,8' and 10,10' thus can elastically bend outwardly and, in connection with protuberances 9,9' and 11, 11', they form a clamping or snap-action closing mechanism.

To fix the attachment to a spectacle temple (FIG. 6) of a normal spectacle frame, the temple ned portion after being passed through the upwardly and downardly open hole 4, between portions 5 and 7, is tilted downwardly, until the temple end applies against the bottom of groove 5 of end portion 3 of the attachment. Thereby the straight portion of the temple becomes simultaneously engaged into both U-section portions 5 and 7 of leg 2. The non-positive connection between the attachment and the temple is effected by a clamping or snap-action mechanism formed by the resilient walls and protuberances. That is, while tilting the attachment, the protuberances are initially pushed outwardly and after the passage of the temple, return resiliently to their initial positions while forming a nonpositive connection. The temple is then enclosed and held fast in the U-section portions 5,7. By tilting the attachment in the opposite direction, the temple can be pushed out of portions 5,7 and withdrawn through hole 4. The attachment is so conformed to the given spectacle temple that a secure non-positive connection is obtained, and that the spectacle frame is reliably held in place by the end portion of the attachment.

I claim:
1. An attachment for a spectacle temple, comprising:
   a leg (2);
   a substantially semicircular end portion (3) connected to one end of said leg, said leg having an opposite free end;
   said leg having a horizontally extending open-ended oblong hole (4) therein, an upwardly U-shaped zone (5) on said one end of said leg adjacent said end portion (3) and communicating with said hole, and a downwardly open U-shaped zone (7) on said opposite free end of said leg, communicating with said hole, said upwardly open U-shaped zone being spaced from said downwardly open U-shaped zone along said leg with said oblong hole opening upwardly and downwardly through said leg between said upwardly and downwardly opened U-shaped zone whereby a spectacle template can be inserted through said oblong hole between said upwardly and downwardly open U-shaped zones and then rotated into a remainder of said oblong hole between said upwardly and downwardly U-shaped portions.

2. An attachment according to claim 1, including means connected to said leg for establishing a clamping snap-action connection between a spectacle temple in said horizontally extending oblong hole and said leg.

3. An attachment according to claim 2, wherein said downwardly open U-shaped zone (7) comprising a pair of spaced apart side walls (8,8'), said means comprising a small protuberance (9,9') on each side wall adjacent a downward opening of said downwardly open U-shaped zone, at least one of said side walls being resilient for accepting a spectacle temple.

4. An attachment according to claim 3, wherein said upwardly facing U-shaped zone comprises a pair of spaced-apart side walls (10,10'), said means comprising a small protuberance (11,11') on each side wall adjacent an upward opening of said upwardly open U-shaped zone, at least one of said side walls being resilient for receiving a spectacle temple.

5. An attachment according to claim 4, wherein said upwardly open U-shaped zone (5) defines a downwardly narrowing groove extending in said leg (2) and into said end portion (3) with said groove decreasing in depth as it extends increasingly into said end portion.

6. An attachment according to claim 5, wherein said leg and said end portion are made of a single piece of material.

7. An attachment according to claim 6, wherein said material is thermoplastic which is elastic at room temperature.

8. An attachment according to claim 2, wherein said upwardly facing U-shaped zone comprises a pair of spaced-apart side walls (10,10'), said means comprising a small protuberance (11,11') on each side wall adjacent an upward opening of said upwardly open U-shaped zone, at least one of said side walls being resilient for receiving a spectacle temple.

9. An attachment according to claim 2, wherein said upwardly open U-shaped zone (5) defines a downwardly narrowing groove extending in said leg (2) and into said end portion (3) with said groove decreasing in depth as it extends increasingly into said end portion.

10. An attachment according to claim 2, wherein said leg and said end portion are made of a single piece of material.

11. An attachment according to claim 10, wherein said material is thermoplastic which is elastic at room temperature.

* * * * *